United States Patent [19]

Ball et al.

[11] Patent Number: 5,112,565
[45] Date of Patent: May 12, 1992

[54] NUCLEAR REACTOR MULTI-STATE DIGITAL CONTROL USING DIGITAL TOPOLOGY

[76] Inventors: Russell M. Ball, 1620 Belfield Pl., Lynchburg, Va. 24503; John J. Madaras, 215 Shady Oak La., Forest, Va. 24551

[21] Appl. No.: 460,438

[22] Filed: Jan. 3, 1990

[51] Int. Cl.$^5$ .............................................. G21C 7/30
[52] U.S. Cl. .................................... 376/216; 376/217
[58] Field of Search ................................. 376/216, 217

[56] References Cited

U.S. PATENT DOCUMENTS

| | | | |
|---|---|---|---|
| 4,290,851 | 9/1981 | Ball et al. | 176/24 |
| 4,308,099 | 12/1981 | Ball | 376/217 |
| 4,637,911 | 1/1987 | Bernard, Jr. | 376/217 |
| 4,710,341 | 12/1987 | Bernard et al. | 376/216 |
| 4,781,881 | 11/1988 | Bernard | 376/216 |

OTHER PUBLICATIONS

"Three-Bean Salad Digital Control of Stepped Reactivity for Fast-Responding Space Reactors"—Madaras, Bingham & Ball—Paper Presented at 6th Symposium on Space Nuclear Power Systems, Conf. 890103-Summs., Held in Albuquerque, New Mexico, Jan. 8-12, 1989, pp. 470-475.

"Application of the Three-Bean Salad Control Algorithm to a Fixed-Time Reactor Startup"-Bingham, Madaras & Ball—paper presented at the 7th Symposium on Space Nuclear Power Systems, held in Albuquerque, N.M. on Jan. 7-10, 1990, pp. 949-955.

"Operational Performance of the Three Bean Salad Control Algorithm on the ACRR"—Ball, Madaras, Trowbridge, Jr., Talley & Parma, Jr.—paper presented at the 8th Symposium on Space Nuclear Power Systems, held in Albuquerque, N.M. on Jan. 7-10, 1991, pp. 687-692.

"Evaluation of 'Period-Generated' Control Laws for the Time-Optimal Control of Reactor Power"—Bernard, paper in IEEE Transactions on Nuclear Science, vol. 35, No. 1, Feb. 1988, pp. 888-893.

"Synthesis of Optimal Control Systems for Nuclear Power Plants and Power Supplies Aboard Spacecraft-"—U.S.S.R., Bodner et al., Trudy III, Mezhdunarodnogo Simpoziuma, vol. 2, 1972, pp. 277-288 (English translation—pp. 23-37).

"A Comparison of Proportional and Model-Based Control Techniques for Nuclear Reactors"-Bernard, paper presented at the 8th symposium on Space Nuclear Power Systems, Albuquerque, N.M., Jan. 7-10, 1991, pp. 693-701.

Primary Examiner—Donald P. Walsh

[57] ABSTRACT

A control system for a nuclear reactor using an algorithm having a time cycle which is short compared with the delayed neutron lifetimes in the reactor. The use of a "stepping drive" or actuator to change an operating parameter by a fixed unit permits changes in the reactivity of the reactor. The short time cycle of the algorithm allows an evaluation of the reactor and actuation of the stepping drive or actuator during a very short period of time. The algorithm includes digital topology permitting the use of non-linear response functions in the determination of the required change in reactivity or period.

7 Claims, 3 Drawing Sheets

DIGITOP

FIG. I

DIGITOP

NUCLEAR REACTOR MULTI-STATE DIGITAL CONTROL USING DIGITAL TOPOLOGY

TECHNICAL FIELD

The present invention relates, in general, to a control technique for a nuclear reactor and, more particularly, to a control technique for changing the reactivity of the nuclear reactor by incrementally changing a control parameter by a fixed amount.

BACKGROUND ART

Control systems for nuclear reactors have been known for a number of years and have been improved significantly through the use of digital computers. Such computers receive information from the nuclear reactor through sensors and signal conditioners and by applying a series of mathematical manipulations, known as the control algorithm, produce output signals which are applied to actuating systems or control devices that modify the reactivity of the nuclear reactor. Many different algorithms have been developed for the purpose of digital control and the output signals produced thereby typically consist of a combination of digital signals which cause the actuating or control device to move at some combination of acceleration, velocity and/or position to vary the reactivity of the reactor. It has been found that the resulting algorithms are typically very complex in nature, and require substantial computer time and power to implement.

Because of the foregoing, it has become desirable to develop a simple control technique (algorithm) which can incrementally change a parameter, such as the position of an actuator, by a fixed unit to incrementally change the reactivity of the nuclear reactor.

SUMMARY OF THE INVENTION

The present invention solves the problems associated with the prior art and other problems by providing a control technique (algorithm) for incrementally changing a control parameter by a fixed unit to change the reactivity of the nuclear reactor. The control technique utilizes three states: (1) reactivity increased as a result of one unit of motion of a movable control; (2) no change in the movable control resulting in no change in reactivity; or (3) reactivity decreased as a result of one unit of motion of the movable control. The algorithm has a very short cycle time compared with delayed neutron lifetimes in the reactor permitting almost instantaneous correction of errors. In addition, the control technique uses a "stepping drive" or actuator which can incrementally change a parameter, such as the position of the control rods, by a fixed amount, either plus or minus one unit. By changing the relative position of the control rods within the nuclear reactor, the reactivity of the reaction can be varied. In effect, the algorithm completes an evaluation of the state of the nuclear reactor in one time cycle and determines if the stepping drive or actuator should add, subtract, or make no change in reactivity. In addition, the algorithm uses digital topology permitting the use of non-linear response functions in the determination of the required change in reactivity.

DESCRIPTION OF THE PREFERRED EMBODIMENTS

Figure 1:
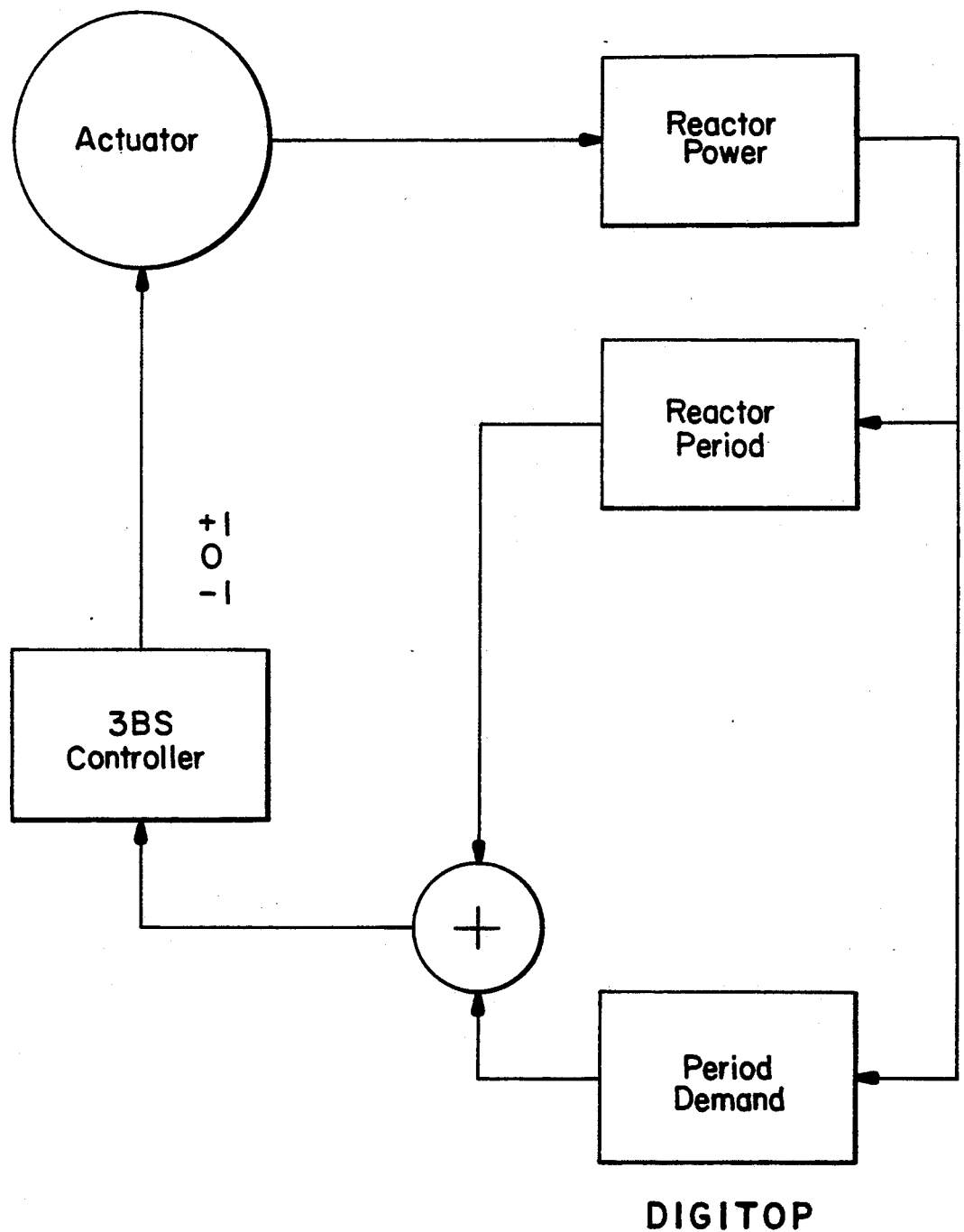
FIGS. 1 and 2 are a schematic diagrams of the control functions of the present invention.
Figure 2:
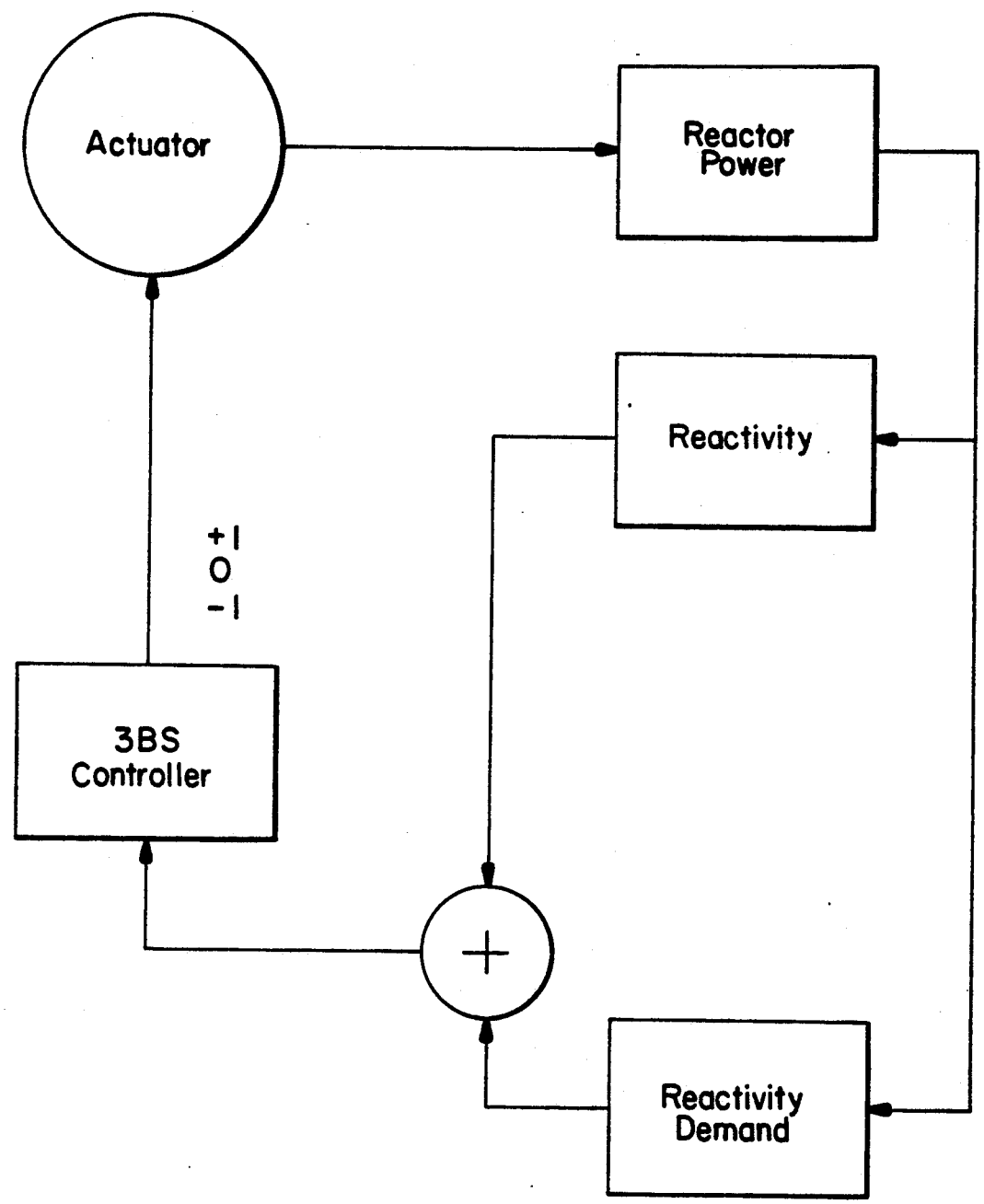

The present invention involves a control technique (algorithm) having time cycles which are short compared with delayed neutron lifetimes in nuclear reactors. A typical algorithm cycle in this case is of the order of 10 milliseconds. Even though the foregoing time cycle is short, an evaluation of the reactivity of the system or the instantaneous reactor period can be accomplished during same. In addition, the foregoing actuator or control technique (algorithm) can be utilized in conjunction with a "stepping drive" or actuator which can incrementally change a parameter by a fixed amount, either plus or minus one unit. The motion and/or position of the apparatus attached to the stepping drive or actuator can be used to change the reactivity of the nuclear reactor or some other parameter which affects reactivity. Thus, the foregoing control technique completes an evaluation of the state of the system in one time cycle and determines if the stepping drive should add, subtract, or make no change in the of the nuclear reactor reactivity. In effect, the total control action is completed in one time cycle. In addition, digital topology is provided as part of the foregoing control technique. Such topology permits the use of non-linear response functions in the determination of the required change in reactivity.

A primary advantage of the present invention is a reduction in the number of algorithm calculations required to determine the proper control action to be taken. The short cycle times for the algorithm permit almost instantaneous correction of any errors. In addition, the use of a stepping drive or actuator eliminates the necessity for position or velocity feedback signals within the drive system. Each "step" uses the maximum capability of the actuator or drive. Furthermore, the use of digital topology based on pre-calculated functions permits the utilization of response functions which can be non-linear. In this case the system is designed to provide an output from a memory location which contains a pre-calculated value. The selection of the memory location is based on the value of an input parameter which has been converted to a digital address by conventional analog to digital techniques. Such techniques can be implemented without the use of a stored program computer system. Thus, the resulting algorithm can be implemented at significantly higher speeds and without the use of software programming. The result is a control system that is small, light weight and consumes very little power.

Previous control technique have been based on the principle that when control action is required, reactivity changes should be made at the maximum rate available by the control mechanism. Typically, the control mechanism is "stepped" at its maximum rate until the reactor power is escalating on the desired period. The control mechanism then holds that period until the output from the DIGITOP (desired period) changes. The input to the DIGITOP can be reactor power, temperature of coolant, temperature of fuel or any combination of measured parameters.

The control technique of the present invention produces a smooth start-up that minimizes the reactor startup time, within the constraints of the control element worth curve and the maximum speed of the control actuators. The control technique also minimizes both the motor torque requirements of the stepping motors and the number of calculations required in the control computer. These modifications provide a smooth, start-up without overshooting either the full power level or the limiting reactor start-up rate, see FIG. 3.

Figure 3:
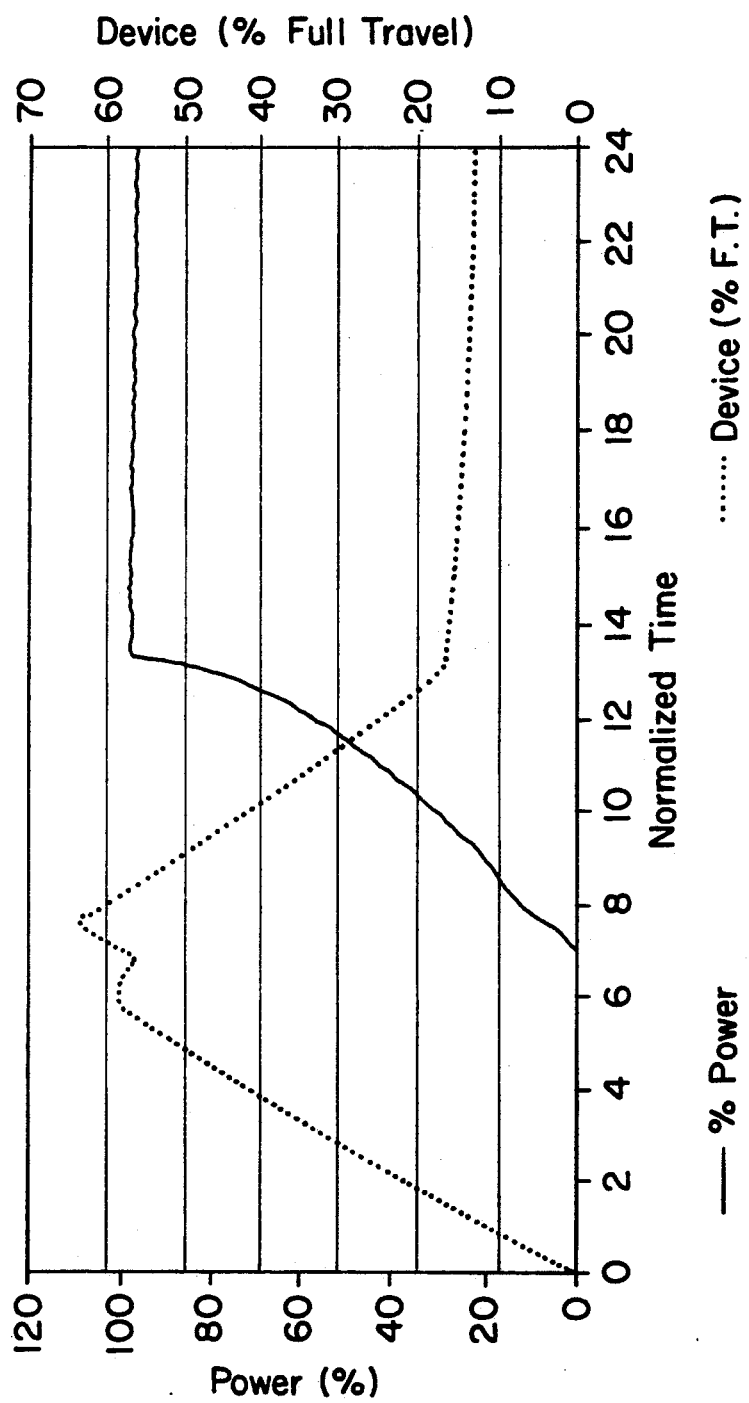
FIG. 3 is a graph of power versus time when the control technique of the present invention is utilized in a fixed time environment.

The control technique of the present invention has been utilized with a simulation model of a nuclear reactor. The simulation used the reactivity worth curve established by the control elements as a function of position, and the results of the simulation are illustrated in FIG. 3. In this case, the control drive mechanism used a cycle time of 10 milliseconds which is the cycle time for the control computer. Until the reactor reached the demand period, the control drive mechanism was being moved one increment for each cycle.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. A control system for a nuclear reactor in which the power level is altered by adjustments in reactor reactivity, comprising:

means for determining the reactivity of the nuclear reactor, said determining means having a cycle time which is less than the delayed neutron lifetimes in the nuclear reactor; and stepping drive means for adjusting said reactivity by incrementally changing a parameter by a fixed amount of either plus or minus one unit.

2. The control system as defined in claim 1, wherein said stepping drive means for adjusting said reactivity comprises apparatus for changing a position of movable control rods within the nuclear reactor by a fixed unit amount.

3. The control system as defined in claim 1, further including response function means for determining a required change in reactivity of the nuclear reactor to achieve said altered power level.

4. The control system as defined in claim 3, wherein said response function means uses digital topology to produce a non-linear response.

5. The control system as defined in claim 1, wherein said means for determining the reactivity of the nuclear reactor includes means, linear or non-linear, for determining a required reactivity of the nuclear reactor to reach a desired power level and comparing it with an existing reactivity to determine a control signal.

6. The control system as defined in claim 5, further including means for detecting a period of the nuclear reactor, said determining means comparing said reactor period with a required reactor period and producing a response representative of a difference therebetween, said stepping drive means for adjusting said reactivity being responsive to said difference causing said reactor period to approach said required reactor period.

7. The control system as defined in claim 6, further including means for limiting said reactor period, said means for determining the reactivity of the nuclear reactor preventing said required reactor period from exceeding a period produced by said limiting reactor period means.

* * * * *

UNITED STATES PATENT AND TRADEMARK OFFICE
CERTIFICATE OF CORRECTION

PATENT NO. : 5,112,565
DATED : May 12, 1992
INVENTOR(S) : Ball et al.

It is certified that error appears in the above-indentified patent and that said Letters Patent is hereby corrected as shown below:

On the title page, item [73] insert Assignee: The Badcock & Wilcox Company New Orleans, Louisiana--.

Also on the Title Page, Attorney, Agent, or Firm is missing and should read --Robert J. Edwards, Vytas R. Matas and Eric Marich--.

Signed and Sealed this

Fifth Day of September, 1995

Attest:

BRUCE LEHMAN

*Attesting Officer*  *Commissioner of Patents and Trademarks*